Dec. 14, 1937.  J. F. CAMPBELL  2,102,552
MOLD BREAKER
Filed Oct. 29, 1935  5 Sheets-Sheet 2
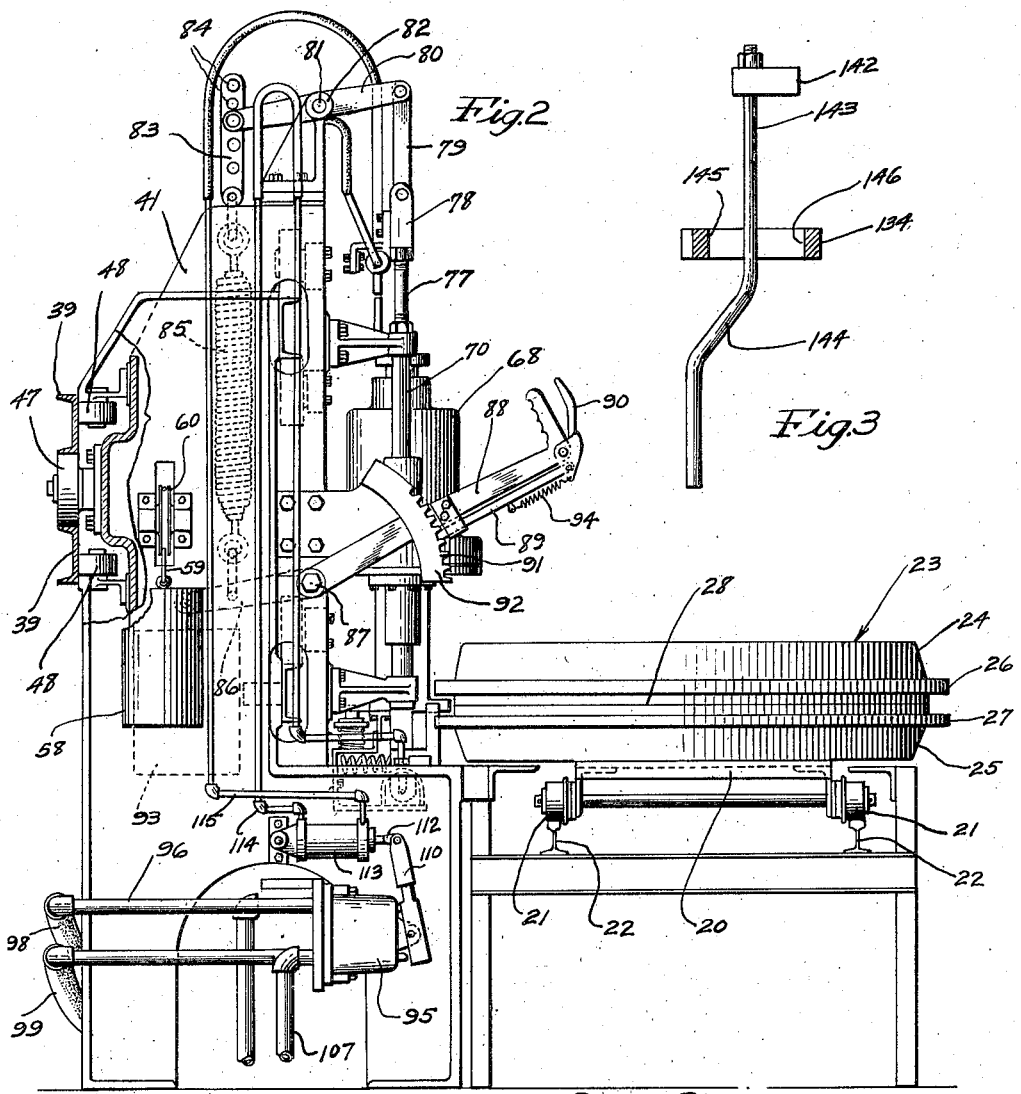
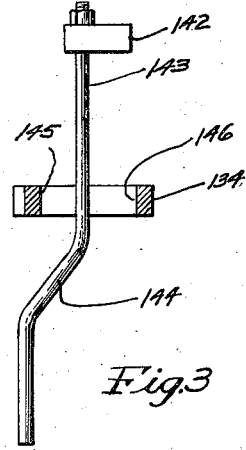
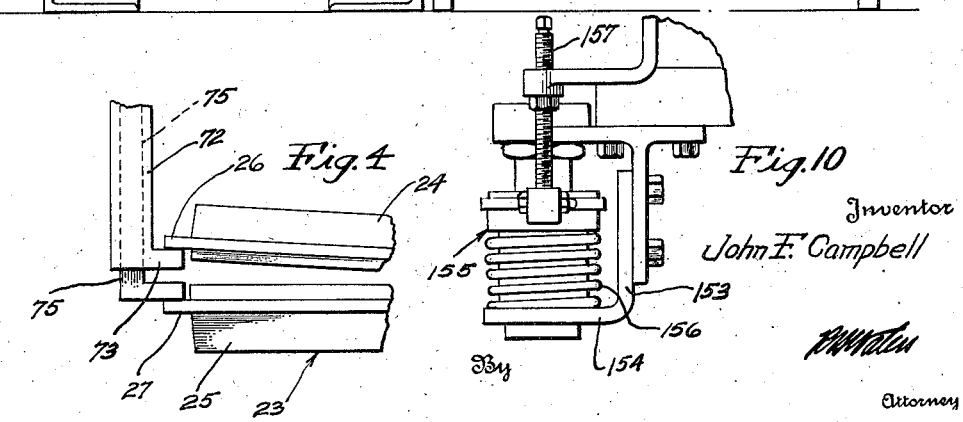
Inventor
John F. Campbell
By
Attorney

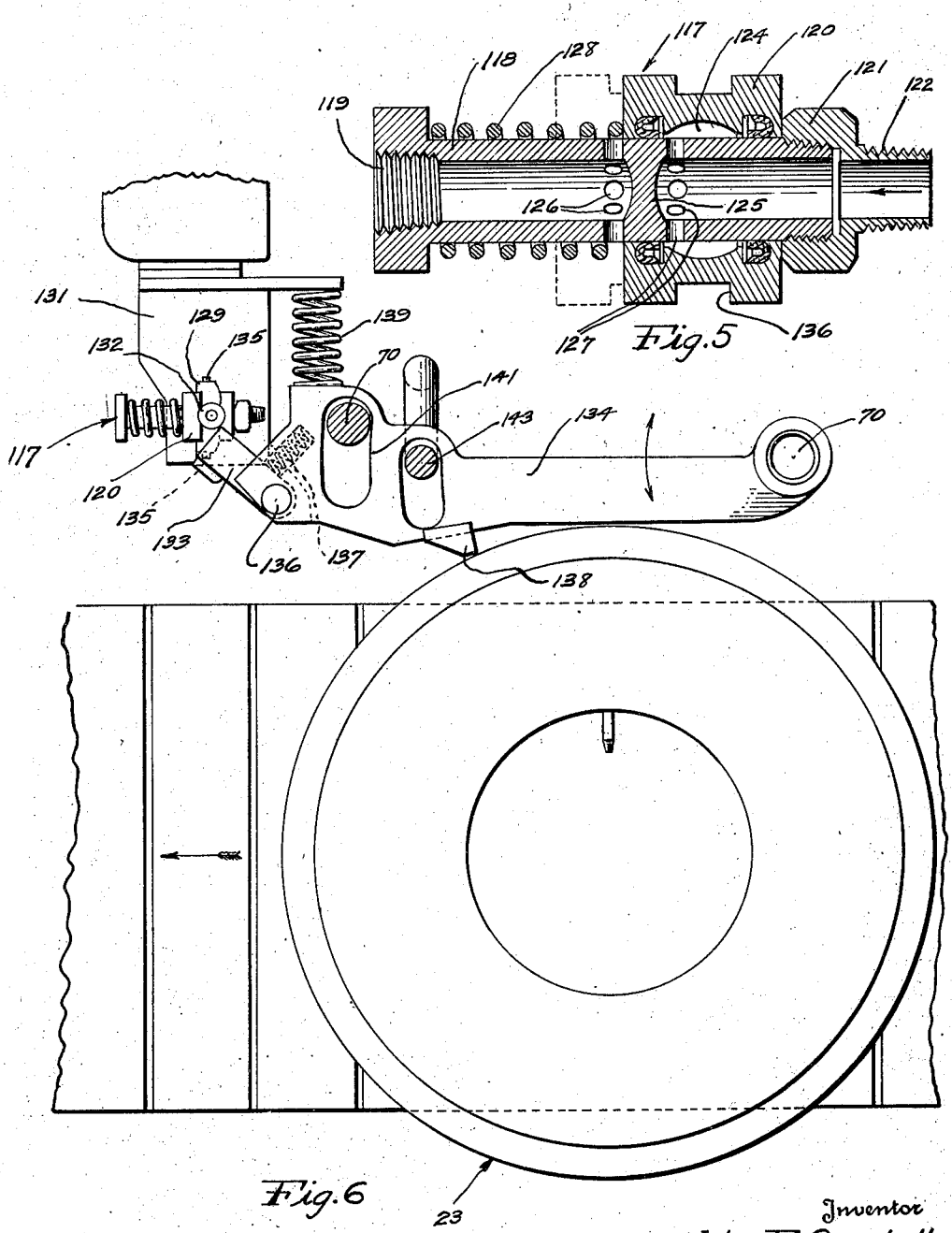

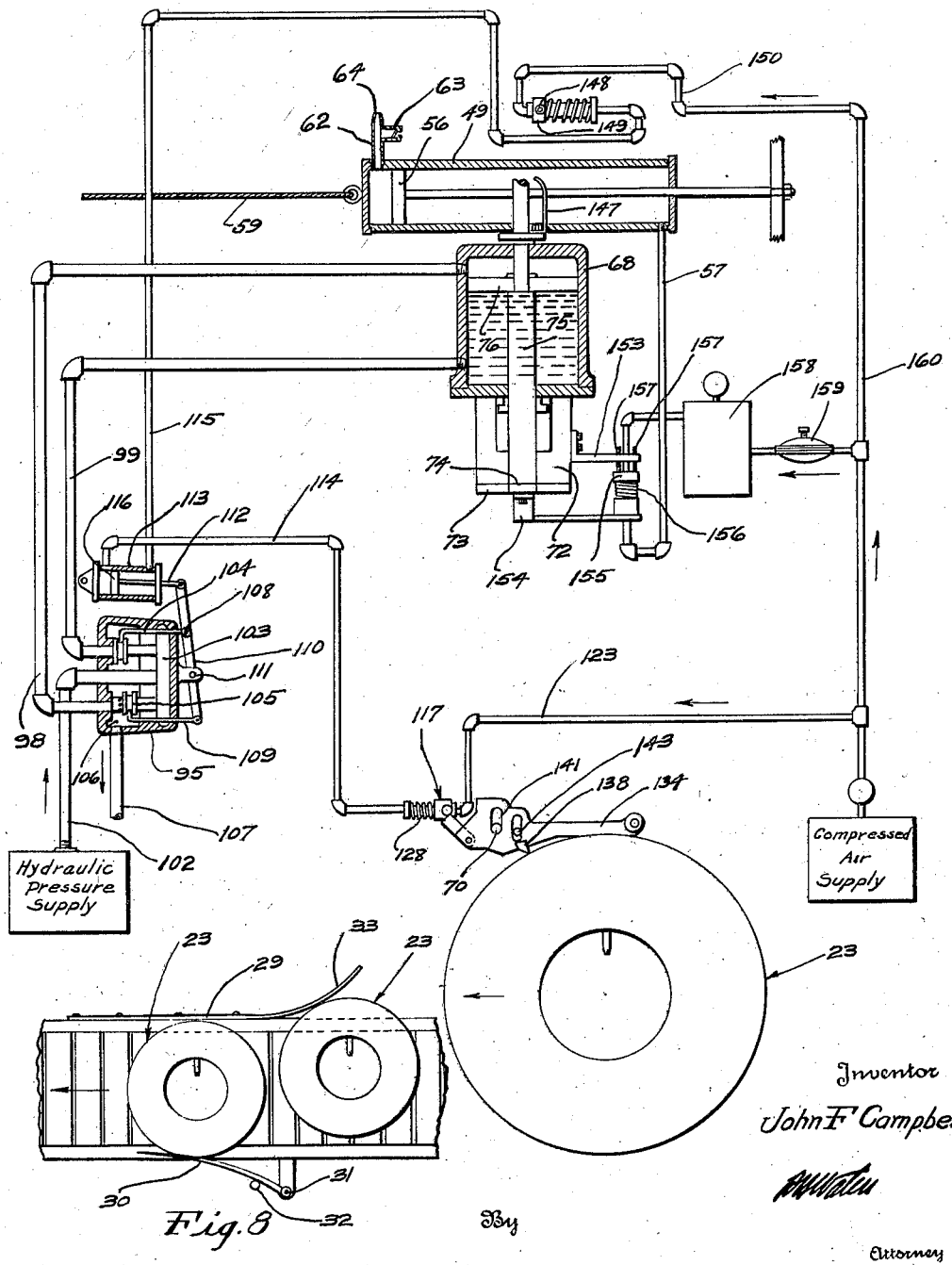

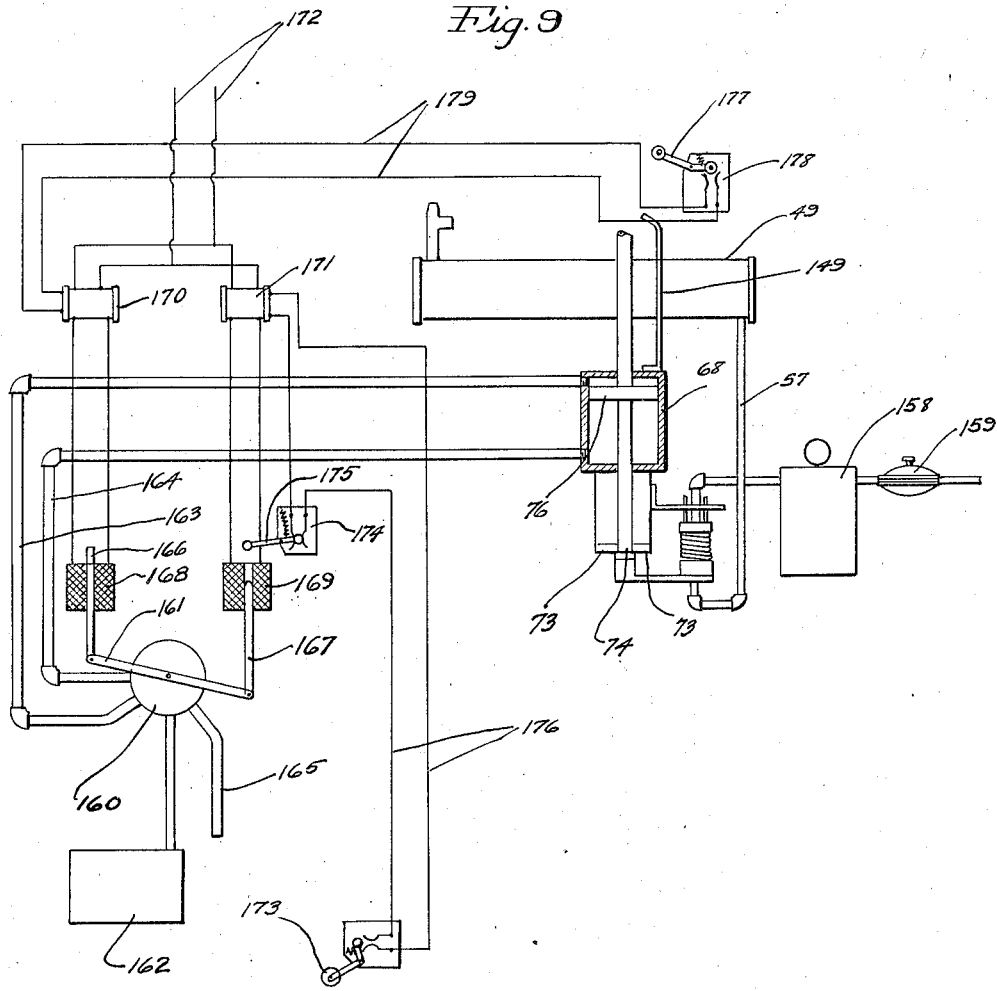

Patented Dec. 14, 1937

2,102,552

UNITED STATES PATENT OFFICE 2,102,552

MOLD BREAKER

John F. Campbell, Cuyahoga Falls, Ohio, assignor to Wingfoot Corporation, Wilmington, Del., a corporation of Delaware Application October 29, 1935, Serial No. 47,243

27 Claims. (Cl. 18—2)

The present invention relates to mold breakers for opening multi-parted molds, particularly those used in the rubber industry for curing automobile tires. These molds are generally made in two sections, each section being in the form of a disc or annulus, each section forming one-half of the tire, as is well understood in the art to which this invention pertains. In the rubber industry, particularly, these molds are difficult to separate in view of the fact that the tread design is formed by a multiplicity of ridges on the interior surface of the mold and some of these project into the cured tire surface at practically right angles to the direction in which the mold sections must be separated. Therefore, in separating the mold sections, the tire itself has to be distorted in order to pull out this multiplicity of ridges from the grooves in the tire, and the result is that a tremendous force is necessary to separate the mold sections.

Some steps have been taken to devise mechanical means to separate such mold sections, such as by using a hydraulic mold breaker having oppositely movable members which engage annular flanges on the mold sections to force the same outwardly away from each other. While these mold breakers have lessened the amount of manual labor necessary to separate the same and separate them more efficiently than by hand labor, nevertheless these devices still require considerable manual labor in moving them around into the mold-opening position and they are not designed for automatic operation or for large-scale production work.

Therefore, one object of this invention is to provide a mold breaker which is automatic in operation so that whenever the molds arrive at a predetermined position in their travel along a given path the mold breaker will become operative and break the mold without requiring the attention of an operator except, perhaps, in cases of emergency.

Another object of this invention is to provide a mold breaker which will operate to separate mold sections as they are presented at the mold-breaking position and independently of the spacing of the molds along their path of travel. In other words, these molds generally rest freely on a conveyor on which they are placed by the operators who remove the same from the curing pits, and as a result the molds are not evenly spaced along the conveyor and it is necessary that the mold breaker be so operated that regardless of the spacing of the molds on the conveyor, the mold breaker will operate on each and every one of the molds when they are properly aligned with respect to the mold breaker.

Another object of this invention is to provide means for aligning the molds laterally of the conveyor so that the edges thereof at one side of the conveyor will be properly presented to the mold breaker. These molds are of different diameters and, since the mold breaker occupies a fixed position along one side of the conveyor, it is necessary to line up the edge of the mold on that side of the conveyor so that it will arrive at the mold-breaking position in proper relation to the mold breaker, as otherwise the mold breaker will not become operative to open the mold.

Another object of this invention is to provide mechanism which will cause a complete cycle of operation for the mold breaker, once the operation is started. This is to insure that there will be no misoperation of the mold breaker, as might occur if the cycle of operation were interrupted or if the various parts thereof were not completely operated as intended. This will be described more fully hereinafter in the detailed description of the invention.

Another object of this invention is to provide means whereby the mold breaker is moved along with the mold as the mold is being broken so that it is unnecessary to stop the conveyor or mold at the position where the breaking begins. Preferably the speed of movement of the mold breaker is governed by the mold itself, so that any variation in the speed of movement of the conveyor will not affect the mold-breaking operation. However, it is possible, but not preferable, to use mechanical means for moving the mold breaker at the speed of the conveyor without being dependent upon the mold itself. One reason why it is preferable to have the mold govern the mold breaking is that, should the mold itself come to rest or slip relative to the conveyor, the mold-breaking operation will take place just as efficiently for, if the mold is at rest, the mold breaker will also be at rest and will not move in the direction of normal conveyor travel, this always occupying a fixed relative position with respect to the mold. Or, if the mold slips on the conveyor longitudinally thereof, the mold breaker will also slip a corresponding amount relative to the conveyor, and this would not be possible with a mechanical tie-up between the conveyor and the mold breaker.

Another object of this invention is to provide means for automatically returning the mold breaker to the initial position which it occupied after the mold has been broken and, in speaking of this initial position, I refer both to the position which the same occupies longitudinally with respect to the conveyor, as well as with respect to the mold-breaker mechanism proper.

Another object of this invention is to provide either fluid pressure or electrical means, or a combination of both for actuating the various parts of the mold breaker.

Another object of this invention is to provide mechanism which, while in the present instance is illustrated as controlled by the mold itself, is capable of manual control without departing from the spirit of the invention described and claimed in this application.

Another object of this invention is to use hydraulic pressure for operating the mold breaker proper to give the necessary pressure for separating the mold sections.

Another object of this invention is to provide means for regulating the rate at which the mold breaker is returned to its initial position and to provide means for bringing the mold breaker to rest without jarring the mechanism, even when the mold breaker is returned to its initial position at a rather rapid rate.

A still further object of this invention is to provide means for adjusting the vertical positions of the mold-engaging portions to take care of molds having parting lines and rim flanges of different vertical heights above the conveyor, provision being also made for counter-balancing the weight of the mold breaker while same is held in its vertically adjusted position, so that it can have a bodily movement in a vertical direction to accommodate itself to slight irregularities in the different molds.

Other objects of this invention will appear hereinafter as the description of the invention proceeds, the novel features, arrangements and combinations being clearly set forth in the specification and in the claims hereunto appended.

In the drawings:

Fig. 2 is a side elevation of the same looking from the left in Fig. 1, some of the parts being broken away and in section for the sake of clearness;

Fig. 3 shows a detail of my invention partly in elevation and partly in section;

Fig. 4 is a fragmentary view illustrating the manner in which the mold breaker separates the mold sections;

Fig. 5 is a cross-section through one of the air valves controlling the operation of the mold breaker and is typical of other similar valves utilized in this construction;

Fig. 6 is a plan view of the mechanism for instigating the operation of the mold breaker, the same being shown in its relative position with respect to the conveyor and mold;

Fig. 7 illustrates diagrammatically the control mechanism for the mold breaker;

Fig. 8 is a plan view of the means for lining up the molds on the conveyor laterally thereof so that they will be in proper position to be acted upon by the mold breaker when the molds arrive at the mold-breaking position;

Fig. 9 is a diagrammatic view similar to Fig. 7 showing a modified arrangement using electrical means in part for operating the mold breaker; and Fig. 10 is a side elevation of a detail of one of the valve mountings.

Figure 1:
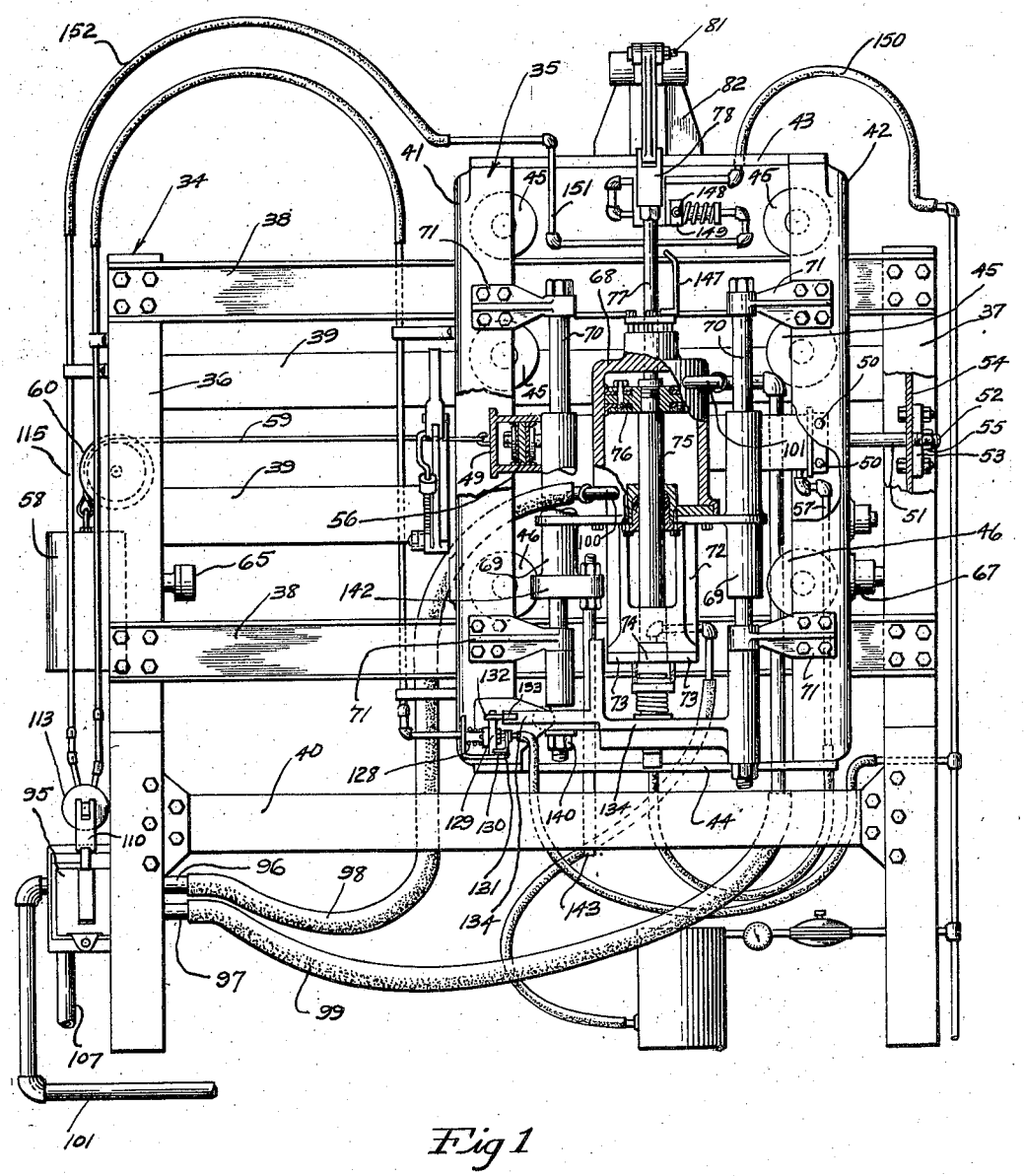
Fig. 1 is a front elevation of a mold breaker embodying my invention, some of the parts thereof being broken away and in section for the sake of clearness.

Briefly, my invention contemplates the use of a mold-breaking apparatus located at one side of a link conveyor or the like, having a main frame with guides arranged parallel to the path of movement of the upper run of the conveyor. These guides support a movable carriage which in turn supports the hydraulic mold breaker. This mold breaker is counter-balanced by suitable means, such as a weight, and includes a yieldable connection with the weight so as to permit the mold breaker to have independent vertical movement relative to the counter-balancing means, as will be more fully described hereinafter. The mold breaker is guided vertically on the carriage and hydraulic supply conduits are arranged to supply pressure to the upper and lower sides of a piston arranged within a hydraulic cylinder. To the cylinder and piston, respectively, there is connected, respectively, mold-ring engaging means for engagement between spaced parallel rings on the respective mold halves whereby when pressure is admitted to the side of the piston the mold-engaging means move in opposite directions to force the opposite halves of the mold outwardly away from each other. The mold breaker is returned to its original position by introducing fluid under pressure to the opposite side of the piston.

The supply of fluid to the fluid-pressure cylinder is controlled by an air valve, which in turn has a suitable means which is engaged by the mold as it arrives at the mold-breaking position to actuate the air valve and thus supply air to the hydraulic valve which distributes the pressure to the desired side of the piston to separate the molds. After predetermined travel of the piston relative to the cylinder, a second air valve actuates (in this case by means on the hydraulic cylinder) the hydraulic valve in such a way as to supply hydraulic pressure to the other side of the piston, thus returning the parts to their initial position, the hydraulic pressure holding the parts in this position until the next operation. An air cylinder normally has air supplied to one side of a piston therein in such a way as to hold the carriage in its initial position. As soon as the hydraulic cylinder begins to operate, the air in this air cylinder is released slowly so as to form a cushion, and a weight connected to the carriage pulls the carriage along its guides at a speed determined by the speed of the mold. The weight which moves the carriage along its guides is just about sufficient to overcome the frictional forces resisting the movement of the carriage along its guides, the mold itself supplying the added force necessary to move the mold-breaker carriage along its guides at the same speed as the mold. When the mold halves have been separated the necessary amount, the air valve for controlling the hydraulic supply which returns the mold breaker to its initial position, is actuated, and the parts returned to their initial relative positions, as far as the hydraulic cylinder and piston are concerned. These parts having been returned to their initial position, the air valve for the air cylinder is then actuated to admit air under pressure to the cylinder to return the carriage to its initial position. A regulating valve in the air line to the air cylinder may be adjusted to regulate the speed at which the carriage is returned to its initial position.

Should the mold, when it first engages the means which trips the first air valve, and which in turn controls the hydraulic valve, stop or slip relative to the conveyor, the parts continue to function to open the mold to relieve the strain on the parts which might otherwise occur. For instance, this first air valve controls the hydraulic valve and there might be merely a slight operation of this air valve if the mold had not advanced far enough along its path of travel. However, if it is operated sufficiently to start the hydraulic piston and cylinder moving relative to each other, a means is provided for completely actuating the first air valve so that it will move to its wide-open position, thereby insuring that the hydraulic valve will be open to its fullest extent to give maximum compression for opening the mold. I will now proceed to describe this invention in detail.

As is seen from an inspection of Figs. 4, 6 and 8, there is provided a conveyor 20, preferably of the link-belt type supported by suitable rollers 21 on guide rails 22. The mold indicated generally at 23 is composed of the upper and lower sections 24 and 25 having annular rings or projecting flanges 26 and 27 thereon spaced from each other and from the parting 28 of the mold.

Referring particularly to Fig. 8, it will be noted that at one side of the conveyor, which is the side on which the mold breaker is arranged, there is provided a vertical guide 29 against which the mold is forced by means of a spring 30 arranged at the opposite side of the conveyor, the spring being mounted on the pin 31 and backed up by a pin 32 to assist the resilient action of the spring. On the first-mentioned side of the conveyor the vertical guide 29 has a curved continuation 33 thereof curved away from the conveyor to engage the mold to guide the same laterally onto the conveyor if the mold projects too far over that side of the conveyor to be in proper alignment for the mold-breaking operation. Molds which are projecting too far from the other side of the conveyor are projected over against the guide 29 by the spring 30. With this arrangement the molds are properly aligned on the conveyor before they reach the mold-breaking apparatus.

The mold breaker comprises a stationary frame portion 34 and a movable carriage 35 mounted to slide along suitable guides on the frame portion 34. The frame portion 34 and end members 36 and 37 are braced laterally by the front guide rails 38 and the rear guide rails 39, as well as other longitudinally extending guide braces, such as 40. The carriage comprises vertical end members 41 and 42 connected by upper and lower braces 43 and 44 connected respectively to the upper and lower ends of the members 41 and 42. Rollers 45 secured to the end members 41 and 42 straddle the upper front guide rail 38 to prevent vertical movement of the carriage and also provide a rolling guide therefor. Similar guide rollers 46 secured to the end members 41 and 42 engage and roll along the upper side of the guide rail 38.

As will be seen more clearly in Fig. 2, the carriage is also provided with guide rollers 47 which engage between the rear guide rails 39 to prevent vertical movement of the rear side of the carriage. The rollers roll along the lower guide rail 39 but will, on occasion, engage the upper guide rail 39 to prevent upward movement of the rear side of the carriage if a strain is placed on the carriage in such a direction as to move this rear side of the carriage upwardly. Rearward movement of the carriage is prevented by means of the guide rollers 48 arranged on vertical pivots on the end members 41 and 42. Obviously, other means may be used for guiding the carriage longitudinally of the frame 42, but that illustrated forms a very rugged construction adapted to stand up under the heavy duty required of this apparatus, while at the same time lessening the frictional resistance to the carriage moving along its guides 38 and 39.

An air cylinder 49 is secured as by the bolts 50 between the end members 41 and 42 so as to partake of the movement of the carriage. A piston rod 51 has a threaded end 52 threaded into the bracket 53 on a web 54 of the end frame member 37 and is locked in place by a lock nut 55, whereby the piston rod is held fixed with respect to the frame 34. The frame end of the piston rod carries the piston 56 which operates within the air cylinder 49. Assuming that the carriage 35 is at the left of the frame 34 instead of at the right as shown in Fig. 1, it will be apparent that, if air is introduced into the air cylinder through the conduit 57, the carriage will be moved to the right into the position shown in Fig. 1. In order to move the carriage in the opposite direction, I provide a weight 58 connected by a cable 59 running over a pulley 60 to the air cylinder, the end of cable 59 being connected to a hook 61 or other suitable means on the air cylinder. The weight 58 is sufficient, or approximately so, to overcome the forces which normally tend to retard the movement of the carriage 35 along the guide rails 38 and 39. Therefore, it is a very easy matter for the mold, when it becomes operatively connected to the carriage 35, to move the carriage along its guide rails without disturbing the position of the mold on the conveyor, the mold regulating the speed of travel of the carriage to the left.

In Fig. 7, I have shown an air-control means 62 fitted to the left end of the cylinder 49. This air control means comprises a check valve 63 and an orifice 64. As the carriage moves to the left, air flows freely into the left end of the cylinder 49 through the check valves 63 and orifice 64. Should the carriage 35 be given its entire permitted travel to the left, it will strike a rubber cushion 65 but, preferably, the cycle of operations is so arranged that the mold breaker completely opens the mold before the carriage completes its travel to the left, with the result that the means for returning the carriage operates to return the carriage to its initial position at the right before the carriage strikes the rubber cushion 65.

The carriage is returned to its right-hand position by air introduced into the cylinder 49 through the conduit 57. As the carriage reaches its extreme right-hand position there is a decided cushioning of the movement of the carriage, due to the fact that the air to the left of the piston 56 can only escape through the orifice 64, since the check valve 63 closes when the piston moves to the left relative to the cylinder. Therefore, the carriage is brought to rest at the end of its stroke with a sort of cushioned movement and the final checking of the carriage movement is accomplished by means of a rubber bumper 67.

The mold-breaking apparatus comprises a hydraulic cylinder 68 having bearings 69 slidably mounted on guide rods 70 which, in turn, are carried by brackets 71 on the end members 41 and 42 of the carriage 35. This permits the cylinder to have vertical movement along its guides. As will be seen most clearly from an inspection of Figs. 1 and 4, the underside of the hydraulic cylinder 68 carries a foot 72 having the toe extensions 73 spaced from each other in a horizontal direction. Between the toes 73 there is a toe 74 arranged on the lower end of a piston rod 75 which extends upwardly through the hydraulic cylinder 68 and carries a piston 76 thereon, which reciprocates within the hydraulic cylinder. The upper end of the piston rod 75 has a reduced extension 77 which, as is most clearly illustrated in Fig. 2, carries a yoke 78 at the upper end thereof, and this, in turn, is connected by means of a link 79 to a rocker arm 80 pivoted at 81 to a bracket 82 mounted on the upper brace 43 of the carriage. To the rear of the pivot 81 there is secured another pivoted link 83 and this link has a series of holes 84, any one of which may be used for pivotally connecting the link 83 to the rocker arm 80. The lower end of the link 83 is connected to the upper end of a coil spring 85, which spring in turn is connected to an arm 86 pivoted to a shaft 87 rotatably mounted on the carriage. This shaft 87 also has secured thereto an operating arm 88 used for the purpose of giving the proper tension to the spring 85.

The arm 88 is locked in any desired position by means of a pawl 89 operated by a hand-grip pivoted lever 90, the pawl engaging between adjacent teeth 91 on the rack 92 secured to the carriage 35. The tension in the spring serves to counterbalance the weight of the hydraulic cylinder 68 and associated parts. It serves to regulate also the distance which the toes 73 and 74 occupy in a vertical direction and, by regulating the tension in the spring, the toes can be arranged to enter between the flanges, such as 26 and 27, of any molds which come along the conveyor, regardless of their vertical distance above the conveyor within certain limits.

However, since the weight of the hydraulic cylinder etc. is considerable, and it would be difficult for an operator to move the arm 88 with all of this weight resisting the movement of the arm 88 when its motion is counter-clockwise, as viewed in Fig. 2, I prefer to support a weight 93 on the end of the arm 86 to counterbalance the weight of the hydraulic cylinder etc. and thus permit the arm 88 to be moved with little effort in either a clockwise or counter-clockwise direction. A spring 94 normally holds the pawl 89 in operative position.

Mounted on the end member 36 of the stationary frame 34 is a hydraulic control valve 95 from which there extend two outlets 96 and 97 connected respectively by flexible hose connections 98 and 99 to inlet conduits 100 and 101, which enter the hydraulic cylinder 68 at the lower and upper ends thereof, respectively. With this arrangement, fluid under pressure can be supplied to either the upper or lower side of the piston 76. When supplied to the upper side of the cylinder, the cylinder is raised to move the toes 73 and 74 out of alignment with each other to break open the mold. When fluid is introduced to the lower side of the piston 76, the piston is returned to its normal position shown in Fig. 1. As fluid is being supplied to one side of the piston, it exhausts from the other side of the piston. The same connections carry the fluid away from the cylinder as carry the fluid to the cylinder.

In Fig. 7, I have shown the valve 95 supplied with fluid under pressure from the hydraulic pressure supply through conduit 102 to the pressure chamber 103 of the valve 95. Sliding valves 104 and 105 control the supply of pressure fluid to the conduits 98 and 99 and provide for the exhausting of the fluid into the exhaust chamber 106 from whence it goes into the drain 107. The valves 104 and 105 are constructed similarly to that shown in Fig. 5 of the drawings, except that no spring is used to control the movement of the valve in one direction. Instead, the valves 104 and 105 are controlled by links 108 and 109 pivoted to an operating lever 110, which in turn is pivoted at 111 to the valve casing 95. As shown in Fig. 7, the pressure is being supplied through the conduit 98 and is exhausting from the conduit 99. One end of the lever 110 is pivotally connected to the piston rod 112 of an air cylinder 113. This air cylinder has inlets 114 and 115 through which air is supplied to move the piston 116 longitudinally of the cylinder 113. If air is introduced into the cylinder 113 through conduit 114, the piston 116 is moved to the right, reversing the positions of the valves 103 and 105, causing the pressure fluid to flow through conduit 99 into the upper part of the hydraulic cylinder 68. This starts the mold-breaking operation previously described.

In order to cause air to flow under pressure through the conduit 114, I provide a valve indicated generally by the reference character 117 and shown more fully in Fig. 5, in which 118 is a tubular member provided with screw threads 119 into which the end of the conduit 114 is threaded. A slide-valve member 120 slides on the outside of the tubular member 118 between the full- and dotted-line positions shown in this figure. A lock nut 121 limits the movement of the slide valve in one direction and is threaded at 122 for connection to a supply conduit 123. The valve 120 is provided with suitable packing and has packing glands on either side of the central recessed chamber 124. The tubular member 118 has a somewhat central position 125 on each side of which there are radial openings 126 and 127. Air under pressure is introduced from the right in Fig. 5 or Fig. 7 and is stopped by the partition 125. However, when the valve 120 is moved to the dotted-line position shown in Fig. 5, the central recess chamber 125 permits the air to pass through the tubular member 118 around the partition 125, for in this position of the valve both the holes 126 and holes 127 are in communication with each other through the intermediacy of the chamber 124. A coil spring 128 normally holds the valve 120 in the right-hand position shown in Fig. 5 so that the air is not supplied to the conduit 114.

As will be seen from an inspection of Figs. 1 and 6, there is a lever 129 pivoted at 130 to a bracket 131 which supports the valve shown in Fig. 5. A roller 132 on the upper end of the arm 129 is adapted to be engaged by a trip 133 on the end of an arm 134 pivoted on the reduced end portion of the right-hand guide 70. As will be seen from an inspection of Fig. 6, when the trip member 133 moves in a clock-wise direction, it forces the lever 129 to the left and this lever has pins 135 engaging within the groove 136 in the slide valve 120 whereby to slide the valve into its dotted-line position shown in Fig. 5, thereby causing the air to flow into the conduit 114, which, in turn, operates the piston 116, causing the rocking of the lever 110 and the movement of the valves 104 and 105 to such positions that the hydraulic pressure is supplied to the upper end of the cylinder 68. The trip 133 is pivoted to the arm 134 at 136 and is held in the position shown in Fig. 6 by a coil spring 137. This coil spring permits the trip to pass the roller 132 on the counter-clockwise movement thereof without operating the lever 129. The mold is adapted to engage an abutment 138 on the arm 134 and rock the arm in a clockwise direction as viewed in Fig. 6. A spring 139 returns the arm to its initial position after the mold is out of engagement with the abutment 138. The free end of the arm 134 is supported and guided for horizontal movement by the lower end of the left-hand guide 70, which is provided with a nut 140 which supports the arm but permits horizontal movement thereof, a slot 141 being provided in the arm, forming a guide, which permits the arm to have this pivotal movement.

It sometimes happens that the carriage 35 starts to move along with the mold 23 before the mold has had the opportunity to move the arm 134 to the position in which the trip 133 has passed the roller 132 and, as a result, the trip 133 may remain in engagement with the roller and hold the valve in its dotted-line position shown in Fig. 5, thereby keeping the air under pressure in the conduit 114, whereas all that is desired is to have enough air supplied through conduit 114 to move the piston 116 to its extreme right-hand position. Therefore, in order to insure that the arm 134 will be moved to such a position that the trip will have passed the roller 132, I provide means on the hydraulic cylinder for positively moving the arm to that position regardless of the extent of movement of the arm under the influence of the mold, providing only that the mold has moved the arm 134 sufficiently to introduce some air under pressure to conduit 114. This means is most clearly shown in Figs. 3 and 6. Secured to the lower end of the left-hand bearing 69 in Fig. 1 is a laterally extending bracket 142 which carries a depending rod 143 having a cam section 144, which cam section is arranged just below the arm 134 when the parts are in the position shown in Fig. 1. Supposing that the mold has engaged the abutment 138 and has moved sufficiently along its path of travel to actuate the arm 134 to a point where the valve 120 is open and air is supplied to the conduit 114. Since the air in the conduit 114 will move the hydraulic valve to such a position that fluid is supplied to the upper side of the hydraulic cylinder, it is obvious that the hydraulic cylinder will start to move upwardly, carrying with it the rod 143. As this rod continues to move upwardly the cam portion 144 therein engages the end 145 of the slot 146, through which the rod 143 extends. The result is that the cam portion 144 positively moves the arm 134 to its extreme clockwise position, permitting the valve 120 to close.

Secured to the top of the air cylinder 68 is a fixed trip 147 adapted to engage a roller 148 for operating the valve 149 constructed similarly to that shown in Fig. 5, whereby when the cylinder reaches such a position that the trip 147 operates the valve 149, air under pressure will flow from the conduit 150 through the valve to outlet conduit 151 and from there it is carried through a flexible conduit 152 and conduit 115 to the air cylinder to move the piston back into the position shown in Fig. 7, thereby reversing the position of the hydraulic valve and causing fluid to flow under pressure to the lower side of the piston 76 to thereby return the hydraulic cylinder to its initial position shown in Fig. 1.

Note that if the cam rod 143 were not provided and a condition existed where the valve 120 remained open, then when the hydraulic cylinder reached the position where the trip 147 opened the valve 149 there would be no actuation of the piston 116, or at least there would not be a proper actuation for the air pressure on both sides of the piston would be approximately equal. The result would be that either the device would stop with the hydraulic cylinder in its upper position or some of the parts might give away, although the latter is not very likely. At any rate, by having the rod 143 move the valve 120 to its fully open position, the proper operation of the device in insured and the hydraulic cylinder is returned to its initial position. When the hydraulic cylinder moves downwardly to its initial position the trip 147 moves away from the valve 149 and that valve closes under the influence of the spring embodied therein.

I will now describe the means for operating the air cylinder. As is shown diagrammatically in Fig. 7, the foot 72 on the air cylinder carries a bracket 153 shown extending from the side thereof in Fig. 7, but actually arranged to the rear thereof, as will be seen in Fig. 10. The lower end of the piston rod 75 also carries a bracket 154 which is shown extending to the one side, as in Fig. 7, but actually it extends to the rear as in Fig. 10. Between these brackets 153 and 154 is supported a valve 155 similar to valves 120 and 149. A spring 156 normally holds the valve 155 in closed position and set screws 157 engage the valve 155 to compress the spring 156, and hold the valve in open position when the hydraulic cylinder is in its initial operative position with the toes 73 thereof aligned with the toe 74 on the end of the piston 75. Therefore, after the hydraulic cylinder has traveled upwardly and then downwardly to its initial position, the valve 155 is opened and air under pressure is supplied from the pressure tank 158, the pressure of which is regulated by a pressure-regulating valve 159 in the air line from the main air-supply conduit 160. This causes air to be introduced through the conduit 57 into the cylinder 49 to move the same and the carriage connected thereto to the right, thus bringing the carriage back to its initial position ready for another operation. As soon as the hydraulic cylinder 68 starts its upward movement at the beginning of the cycle of operations, the valve 155 is closed and the air in the cylinder exhausts through the conduit 57 and openings similar to the openings 126 in Fig. 5. Thus, the mold being now gripped by the toes 73 and 74 can cause movement of the counterbalanced carriage in the direction of movement of the mold, the air entering the left-hand end of the cylinder 49 through the check valve 63.

I will now describe briefly the operation of this device. The molds 23 are carried along by the conveyor 20 to a position adjacent the mold breaker. Before they arrive at this position, however, they are lined up on the conveyor by the vertical guide 29 and the spring 30 so that the edges of the molds which lie adjacent the mold breaker will be presented to the mold breaker uniformly. As the mold reaches a position opposite the mold breaker the flanges 26 and 27 on the mold straddle the toes 73 and 74, as is clearly illustrated in Fig. 2. About this time the mold strikes the abutment 138 to rock the arm 134 in a clockwise direction as viewed in Fig. 6, thereby causing the trip 133 to actuate the valve 130 through the intermediacy of the roller 132 and arm 129, causing a flow of air under pressure to the air cylinder 113. This air enters the left-hand end of the cylinder as viewed in Fig. 7, forcing the piston 116 to the right and this, in turn, operates the hydraulic valve 95 to cause the flow of hydraulic fluid through the conduit 99 into the hydraulic cylinder 68 at a point above the piston 76. The entrance of the fluid raises the cylinder 68, in view of the fact that the piston 76 and piston rod 75 are held more or less in fixed position by the linkage 79, 80 and 83 and spring 85. This causes the toes 73 and 74 to move in opposite vertical directions against the flanges 26 and 27, respectively, and continued movement of the hydraulic cylinder separates the two mold halves, leaving the tire held by one of the mold halves.

As the hydraulic cylinder reaches the upper extent of its travel, the trip 147 operates the valve 149 in such a manner as to cause air to flow through the conduit 115 into the air cylinder 113 at the right-hand end thereof as viewed in Fig. 7. This, in turn, operates the hydraulic valve to cause a flow of the hydraulic fluid into the lower end of the cylinder 68, thereby causing the hydraulic cylinder to descend into its original position. The valve 95, as previously explained, is so constructed that when fluid is flowing into the hydraulic cylinder at one end thereof, it is exhausting from the other end of the cylinder.

As the toes 73 and 74 grip the flanges, the toes are separated sufficiently to cause the valve 155 to be closed in the manner previously described, thereby cutting off the flow of air from the air supply to the air cylinder 49, the air cylinder in this cylinder previously holding the carriage in the position illustrated in Fig. 1. Not only is the air supply to the cylinder 49 cut off but the air is permitted to exhaust from the right-hand end of the cylinder 49 through conduit 57, so as to permit the carriage 35 to move freely with the mold in the direction of the travel thereof. The weight 58 which counterbalances the frictional and other forces tends to retard the carriage 35 and it is therefore very easy for the mold to drag the carriage along with it through the gripping engagement of the toes 73 and 74 with the flanges 26 and 27 on the mold.

After the mold has been separated, the carriage 35 has moved to the left until it occupies a position near the left-hand end of the frame 34. As the hydraulic cylinder 68 descends into its initial position relative to the piston, the valve 155 is again opened and air under pressure is supplied to the cylinder 49 to the right of the piston 56 and since this cylinder is connected directly to the carriage 35 the carriage is returned to that position shown in Fig. 1. The speed at which the carriage is returned to its initial position is regulated by the valve 157 which may be any desired type of reducing valve.

Should the mold fail to move the arm 134 as much as is required to move the trip 133 completely past the roller 132, the cam portion 144 on the rod 143 will insure that this is accomplished, for it travels upwardly with the hydraulic cylinder 68, and the cam portion 144 will engage the end 145 of the slot 146 to move the arm 134 sufficiently in an upward direction, as viewed in Fig. 6, to cause the trip 133 to completely pass the roller 132.

The vertical position of the toes 73 and 74 is regulated by the arm 88, which, through the intermediacy of the spring 85, determines the vertical position of the air cylinder and piston rod associated therewith. In addition, the spring 85 permits sufficient relative vertical movement between the piston rod and piston to insure that the toes 73 and 74 will properly engage the flanges 26 and 27. This regulation of the position of the toes is necessary for molds having flanges arranged at different heights. In the event the conveyors should stop with a mold in such a position as to have operated the valve 120 partially, the cycle of movements necessary to completely open the molds and return the parts to their original position will be carried out, regardless of the fact that the mold has stopped its movement in a horizontal direction, and for the reason that the cam 144 will completely operate the arm 134 as previously described in connection with a condition where the carriage starts to move with the mold before the valve 120 is fully opened.

In Fig. 9, I have illustrated a modified means for operating the mold breaker. In this figure, similar reference characters refer to similar parts in the other figures. The electrical means shown in this figure are to be situated in similar positions with respect to the carriage and frame of the machine, the same as in the first form of my invention described.

In place of the hydraulic valve 95 illustrated in the first embodiment, I employ the three-way hydraulic valve 160 operated by a lever 161 to control the flow of hydraulic fluid from the source of supply 162 to either the conduits 163 or 164, the fluid exhausting through the drain 165 from one of the conduits 163 or 164 when fluid under pressure is being supplied from the source of supply 162 to the other of the conduits. The conduit 163 supplies fluid to the upper end of the cylinder 68 and conduit 164 supplies fluid to the lower end of the hydraulic cylinder 68, depending upon the position of the valve 160. To the lever 161 are secured core members 166 and 167 forming cores for the solenoids 168 and 169, respectively. The solenoids 168 and 169 are connected, respectively, to the relays 170 and 171. The solenoids are adapted to be energized only for a period sufficient to raise their respective cores and at different times, the time of operation of the solenoids being controlled by means of suitable switches. The solenoids 170 and 171 are connected to the power line 172 and are controlled by the switches 173 and 174. The latter switch is a normally closed switch having an arm extension 175 adapted to be engaged by the end of the core 167 when the same is raised by energizing the solenoid 169 to open the switch and break the electrical circuit to the relay 171 at this point. The switch 173 is normally opened and is adapted to be engaged by the mold the same as is the abutment 138 in Fig. 6. The mold closes this switch and, since the switch 174 is already closed, the circuit is completed through the leads 176 to the relay 171, causing the solenoid 169 to operate. This draws the core 167 upwardly and the core, in striking the arm 175, opens the switch 174 and the circuit to the relay so that the solenoid will not be burned up or subjected to undue heat, as would occur if the solenoid were permitted to operate until the mold passed out of engagement with the switch 173. This becomes extremely important in the case where a mold should happen to be stopped at the position where it has just closed the switch 173.

The hydraulic cylinder 68, being supplied with hydraulic fluid through the conduit 163 at the upper side of the piston 76, moves upwardly to break the mold and continues its upward movement until the trip 149 strikes the switch arm 177 to close the switch 178 and thus close the circuit to the relay 170 through the leads 179. The operation of the relay 170 causes the solenoid 168 to be energized to draw the core 166 into the position shown in Fig. 9, the dropping of the core 167 during this operation permitting the switch 174 to be closed ready for the next operation. The air cylinder 49 is operated by the connection shown in the same manner as described in connection with the first-described embodiment of my invention, but if desired electrical means could be provided for moving the carriage 35 back to its original position and for holding it there if desired instead of using the air cylinder herein described.

Obviously, those skilled in the art to which this invention pertains may make various changes in the construction and arrangement of the parts described in connection with the embodiments of my invention disclosed without departing from the spirit of the invention and, therefore, I do not wish to be limited except as may hereinafter be set forth in the claims hereunto appended.

Having thus fully described my invention, what I claim and desire to secure by Letters Patent of the United States is:

1. In a mold breaker, the combination with a frame, of a carriage slidable along said frame, a mold conveyor moving in the general direction of movement of said carriage along said frame, relatively movable elements on said carriage for engaging the mold sections of a split mold for separating same, and means actuated by said mold as said mold arrives adjacent said elements for operating said elements and to move said carriage in the direction of mold movement.

2. In a mold breaker, the combination with a frame, of a carriage slidable along said frame, a mold-opening apparatus on said carriage, a conveyor for conveying molds to and past said carriage, means arranged in the path of movement of the molds being carried by said conveyor and actuated thereby, for operating said mold-breaking apparatus when a mold arrives in a position to be operated upon by said mold-opening apparatus, and means for moving said carriage in unison with said conveyor in the general direction of conveyor movement during the mold-breaking operation.

3. In a mold breaker, the combination with a slidably mounted carriage, a conveyor moving in the general direction of movement of which said carriage is capable, a mold-breaking apparatus on said carriage, and means for operating said mold-breaking apparatus when said mold arrives at a position adjacent said mold-breaking apparatus, said mold-breaking apparatus being movable in unison with said mold in the direction of movement of said conveyor during the mold-breaking operation.

4. A mold breaker comprising a conveyor, a carriage mounted for sliding movement substantially parallel to said conveyor, mold-breaking apparatus on said carriage, means for operating said mold-breaking apparatus, and means operable by a mold as it arrives in operative relation with said mold-breaking apparatus, for instigating the operation of said mold-breaking apparatus, said carriage being movable with said mold as said mold moves along with said conveyor and during the operative engagement between said mold and mold-breaking apparatus.

5. A device as set forth in claim 4 in which the means for instigating the actuation of said mold-breaking apparatus comprises fluid-pressure means rendered operative by said mold for actuating the means for supplying the power to operate said mold-breaking apparatus.

6. In a mold-breaking apparatus, the combination with a frame of a mold-breaking means mounted on said frame for sliding movement during the mold-breaking operation, a conveyor mounted for movement past said frame in a direction substantially parallel to the movement of said mold-breaking means, hydraulic means for actuating said mold-breaking means, pneumatic means for controlling said hydraulic means and trigger mechanism for operating said pneumatic means arranged adjacent said conveyor in the path of movement of a mold adapted to be carried by said conveyor whereby it will be actuated by said mold as the latter moves into operative engagement therewith and whereby the operation of said mold-breaking apparatus is controlled by the mold according to the time of arrival of said mold at the mold-breaking position.

7. Mold-breaking apparatus comprising relatively movable parts for engaging and separating mold sections, a conveyor for conveying molds past said mold-breaking apparatus, said mold-breaking apparatus being mounted for bodily movement in the direction of conveyor movement during the mold-breaking operation, and a single operating means which, when operated, sets in motion automatic means for successively moving said elements relative to each other from their initial position into such a position that in operating on a mold the mold sections are separated, next returns said elements to their original position relative to each other and thereafter holds said parts in their inoperative position until the next actuation of said operating means, said mold-breaking apparatus being free to move in unison with said mold as it is carried by said conveyor whereby the movement of the mold with the conveyor is not interrupted during the mold-breaking operation.

8. Mold-breaking apparatus comprising a conveyor for conveying molds, a carriage mounted for sliding movement adjacent said conveyor in a direction substantially parallel to the movement of said conveyor, mold-breaking means mounted on said carriage, means for retaining the carriage in an initial position to present the mold-breaking means to the mold as the latter arrives opposite said mold-breaking means at said initial position, means for operating said mold-breaking means when said mold-breaking means and mold are in proper operating relation with respect to each other, and means for releasing said carriage during the operating of said mold-breaking means to permit said carriage to move with said mold in the direction of mold travel during the mold-breaking operation.

9. In a mold-breaking apparatus, the combination with a mold-breaking means, hydraulic means for actuating said mold-breaking means in opposite directions, pneumatic means for controlling said hydraulic means, including a pneumatic cylinder and piston for operating said fluid-pressure means in opposite directions, a pair of conduits connected to said cylinder for introducing air into said cylinder on opposite sides of said piston, separate valves for supplying the air to said cylinder in each of said conduits, a trigger mechanism operated by the mold as it approaches the mold-breaking position adjacent the mold-breaking means, said trigger mechanism being operatively connected to one of said valves to operate the same on actuation thereof and to immediately release said valve upon full operation of said trigger mechanism, and means connected to said mold-breaking means for insuring the full operation of said trigger mechanism once said mold-breaking means is set in operation whereby to release the flow of air to said pneumatic cylinder on one side of said piston prior to the time when the mold-breaking means reverses its motion whereby upon operation of said other valve the piston will be free to move under the influence of the air introduced through the conduit in which said last-mentioned valve is arranged, and means for operating said last-mentioned valve after the mold-breaking means has broken the mold.

10. Mold-breaking apparatus comprising a mold breaker, a conveyor for moving molds into operative position with respect to said mold breaker, and means for arranging said molds in a predetermined position transversely of said conveyor by the time the same arrive at the mold-breaking position, comprising a fixed abutment arranged along one side of said conveyor and yieldably pressed means on the opposite side of said conveyor for engaging and pressing the molds against said fixed abutment as the molds move along with the conveyor whereby the edge of the mold adjacent said fixed abutment is positioned in a predetermined relation with respect to the adjacent edge of said conveyor.

11. In a mold-breaking apparatus, the combination with a mold support, a mold-breaking apparatus adjacent said support comprising mold-breaking elements, means for operating said mold-breaking elements, said mold-breaking elements being mounted for substantially vertical movement with respect to each other, and also being bodily movable in a fixed vertical path, and means for counter-balancing said elements and operating means to position the same in a balanced position at different points in said path comprising a counter-balancing element which counter-balances said mold-breaking elements and operating means, and means for changing the position of said counter-balancing means whereby the counter-balanced position of said mold-breaking elements is at a different point in its path of bodily movement.

12. A device as set forth in claim 6 in which the counter-balancing means is a spring and in which a pivoted lever having means for locking same in different operative positions is utilized to move the position of said spring counter-balancing means to different operative positions, the spring being also connected to the mold-breaking elements and operating means to correspondingly move same bodily along their path of bodily movement a proportionate amount.

13. Mold-breaking apparatus comprising a frame, a hydraulic cylinder mounted for vertical movement on said frame, mold-breaking elements operated by said hydraulic cylinder, a lever pivoted to said frame, said lever having a pivotal connection with said cylinder at a point removed from its point of pivotal support on said frame, a counterbalancing spring having one end connected to said lever at a point removed from the point of pivotal support of said lever on said frame, and an adjustable member to which the opposite end of said spring is connected, said spring counter-balancing the weight of said cylinder and associated elements to hold the same yieldingly in a given vertical position, and said adjustable member being adjustable to position the spring at different operative positions whereby the position of the cylinder and associated elements in their normal balanced position may be varied.

14. In a mold-breaking apparatus, the combination with a conveyor for conveying molds to a mold-breaking position, of a mold breaker adjacent said conveyor at said position, comprising a frame, a mold breaker mounted on said frame for movement in the direction of movement of said conveyor, fluid-pressure means for normally holding said mold breaker in an initial position to operate on a mold presented thereto by said conveyor, fluid-pressure means for operating said mold breaker, including valve means, trigger means adapted to be engaged by a mold as the latter arrives at said mold-breaking position, a connection between said trigger and said valve means for operating the latter to thereby operate said mold breaker, when said trigger is actuated, means operable upon actuation of said mold breaker for releasing said fluid-pressure holding means whereby said mold-breaking breaker may move with said mold in the direction of movement of said conveyor.

15. In a mold-breaking apparatus, the combination with a conveyor for conveying molds to a mold-breaking position, of a mold breaker adjacent said conveyor at said position, comprising a frame, a mold breaker mounted on said frame for movement in the direction of movement of said conveyor, fluid-pressure means for normally holding said mold breaker in an initial position to operate on a mold presented thereto by said conveyor, fluid-pressure means for operating said mold breaker, including valve means, trigger means adapted to be engaged by a mold as the latter arrives at said mold-breaking position, a connection between said trigger and said valve means for operating the latter to thereby operate said mold breaker when said trigger is actuated, means operable upon actuation of said mold breaker for releasing said fluid-pressure holding means whereby said mold-breaking breaker may move with said mold in the direction of movement of said conveyor, and means for actuating said mold breaker in the direction of movement of said conveyor to assist the movement of said conveyor with the mold upon which it is operating.

16. In a mold-breaking apparatus, the combination with a conveyor for conveying molds to a mold-breaking position, of a mold breaker adjacent said conveyor at said position, comprising a frame, a mold breaker mounted on said frame for movement in the direction of movement of said conveyor, fluid-pressure means for normally holding said mold breaker in an initial position to operate on a mold presented thereto by said conveyor, fluid-pressure means for operating said mold breaker, including electrical means for operating said fluid-pressure means, trigger means adapted to be engaged by a mold as said latter arrives at the mold-breaking position, a connection between said trigger and said electrical means for operating the latter to thereby operate said mold breaker when said trigger is actuated, means operable upon actuation of said mold breaker for releasing said fluid-pressure holding-means whereby said mold-breaking breaker may move with said mold in the direction of movement of said conveyor.

17. In a mold-breaking apparatus, the combination with a conveyor for conveying molds to a mold-breaking position, of a mold breaker adjacent said conveyor at said position, comprising a frame, a mold breaker mounted on said frame for movement in the direction of movement of said conveyor, fluid-pressure means for normally holding said mold breaker in an initial position to operate on a mold presented thereto by said conveyor, fluid-pressure means for operating said mold breaker, including electrical means for operating said fluid-pressure means, trigger means adapted to be engaged by a mold as said latter arrives at the mold-breaking position, a connection between said trigger and said electrical means for operating the latter to thereby operate said mold breaker when said trigger is actuated, means operable upon actuation of said mold breaker for releasing said fluid-pressure holding-means whereby said mold-breaking breaker may move with said mold in the direction of movement of said conveyor, and means for actuating said mold breaker in the direction of movement of said conveyor to assist the movement of said conveyor with the mold upon which it is operating.

18. Mold-breaking apparatus comprising a mold conveyor, a frame mounted adjacent said conveyor, a mold breaker mounted on said frame for movement in a direction substantially parallel to the direction of movement of said conveyor, a fluid-pressure cylinder connected to said mold breaker for normally holding said mold breaker in a position in its path of movement adjacent that end of its path of travel which lies closest to the molds are first presented to said mold breaker by said conveyor, means for operating said mold breaker to break the mold as it is presented to said mold breaker at said position, and means automatically operable after the instigation of the mold-breaking operation for releasing said fluid-pressure means whereby said mold breaker may move along its path of movement in unison with the mold being operated upon.

19. Mold-breaking apparatus comprising a mold conveyor, a frame, a carriage slidable on said frame in a direction substantially parallel to the conveyor movement, a hydraulic cylinder movable with said carriage and also slidably mounted on said carriage for movement transversely to the movement of said carriage, a piston operating within said hydraulic cylinder and movable relative thereto and to said carriage, mold-breaking elements carried by said piston and cylinder, and means for introducing fluid under pressure into said cylinder to move said elements relative to each other when said mold arrives in position adjacent said elements.

20. A device as set forth in claim 19 in which said mold operates the means for introducing fluid under pressure into said cylinder, when said mold arrives in an operative position relative to said mold-breaker elements, such that said elements may act on said mold to break the same.

21. Mold breaking apparatus comprising a mold conveyor, a frame, a carriage slidable on said frame in the direction of conveyor movement, mold-breaking apparatus on said carriage mounted for bodily movement with said carriage in the direction of sliding movement and also movement relative thereto transversely to the movement of said carriage relative to said frame, and means for operating said mold-breaking apparatus at the time a mold is presented thereto.

22. Mold-breaking apparatus comprising a mold conveyor, a frame, a carriage slidable on said frame in the direction of conveyor movement, mold-breaking apparatus on said carriage mounted for bodily movement with said carriage in the direction of sliding movement and also movement relative thereto transversely to the movement of said carriage relative to said frame, and means for operating said mold-breaking apparatus at the time a mold is presented thereto, comprising means operated by said mold for instigating the operation of said mold-breaking apparatus.

23. Mold-breaking apparatus comprising a frame, a carriage slidable on said frame, fluid-pressure means for actuating said carriage relative to said frame in one direction, a conveyor for supporting molds and for moving them to a position adjacent said carriage, mold-breaking apparatus on said carriage for movement therewith engaging said mold and adapted to be moved along said frame in unison with said mold during the operation of said mold-breaking apparatus, and means for actuating said carriage in a direction opposite to that in which said carriage is moved by said fluid-pressure during the time the mold-breaking apparatus is operating to open a mold.

24. A device as set forth in claim 23 in which said fluid-pressure means holds said carriage at the end of its travel until said mold-breaking apparatus begins to operate on said mold, whereafter said fluid-pressure means is released to permit said carriage to move with said mold under the influence of said second actuating means.

25. A device as set forth in claim 23 in which said mold upon moving into operative position relative to said mold-breaking apparatus renders said second actuating means operative.

26. In a mold-breaking apparatus, the combination with a frame, a conveyor adjacent said frame for moving molds past said frame, a carriage slidable along said frame in the direction of conveyor movement, mold-breaking apparatus on said carriage mounted for movement therewith, electrical control means for instigating the operation of said mold-breaking apparatus to break the mold, electrical means for returning said mold-breaking apparatus to initial position and means for moving said carriage relative to said frame in the direction of conveyor movement and in unison with the mold to be broken.

27. In a mold-breaking apparatus, the combination with a frame, a conveyor adjacent said frame for moving molds past said frame, a carriage slidable along said frame, mold-breaking apparatus on said carriage mounted for movement therewith, fluid-pressure control means for instigating the operation of said mold-breaking apparatus to break the mold, fluid-pressure means for returning said mold-breaking apparatus to initial position and means for moving said carriage relative to said frame in the direction of conveyor movement and in unison with the mold to be broken.

JOHN F. CAMPBELL.